United States Patent
Ackermann-Markes et al.

(10) Patent No.: US 7,508,775 B2
(45) Date of Patent: Mar. 24, 2009

(54) METHOD FOR THE AUTOMATIC CONFIGURATION OF A COMMUNICATIONS DEVICE

(75) Inventors: Achim Ackermann-Markes, Wörthsee (DE); Oliver Veits, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 553 days.

(21) Appl. No.: 10/554,032

(22) PCT Filed: Mar. 5, 2004

(86) PCT No.: PCT/EP2004/002265

§ 371 (c)(1),
(2), (4) Date: Oct. 20, 2005

(87) PCT Pub. No.: WO2004/098130

PCT Pub. Date: Nov. 11, 2004

(65) Prior Publication Data

US 2006/0209714 A1   Sep. 21, 2006

(30) Foreign Application Priority Data

Apr. 29, 2003   (DE) ............................... 103 19 323

(51) Int. Cl.
*H04L 12/28*   (2006.01)

(52) U.S. Cl. ..................... 370/257; 370/390; 709/245

(58) Field of Classification Search ............... 370/255, 370/399, 465, 356, 220, 392, 328, 389, 254, 370/257, 390, 475; 709/220, 223, 245; 726/4
See application file for complete search history.

(56) References Cited

U.S. PATENT DOCUMENTS 5,557,748 A * 9/1996 Norris ...................... 709/220
5,892,912 A   4/1999 Suzuki et al.
6,061,334 A * 5/2000 Berlovitch et al. ........... 370/255
6,128,665 A * 10/2000 Iturralde ..................... 709/238
6,167,052 A * 12/2000 McNeill et al. .............. 370/399

(Continued)

FOREIGN PATENT DOCUMENTS

EP   0 889 624 A1   7/1999

OTHER PUBLICATIONS

LAN MAN Standards Committee of the IEEE Computer Society, "Draft Standard P802.1Q/D11, IEEE Standards for Local and Metropolitan Area Networks: Virtual Bridged Local Area Networks", Jul. 30, 1998, pp. 1-4, 30-32, 92-94, 158-165 and 197-199.

*Primary Examiner*—Hassan Kizou
*Assistant Examiner*—Jeffrey M Rutkowski

(57) ABSTRACT

The invention relates to a method for the automatic configuration of a communications device using a reserved identification number, at least one network node device, which administers an associated subnetwork of a network, at least one virtual network, with which the communications device is associated, whereby data packets exchanged within the virtual network are tagged with the reserved identification number. According to the inventive method, a network address of the subnetwork is determined by a network element arranged in the network. A configuration message adjusted with the network address of the subnetwork as the target address is transmitted by the network element to the network node device, which message is transmitted by the network node device to the virtual network as a broadcast message tagged with the reserved identification number. The broadcast message is received by the communications device and the communications device is configured using the identification number.

10 Claims, 3 Drawing Sheets

U.S. PATENT DOCUMENTS

| | | | |
|---|---|---|---|
| 6,223,218 B1 * | 4/2001 | Iijima et al. | 709/221 |
| 6,434,624 B1 | 8/2002 | Gai et al. | |
| 6,507,564 B1 | 1/2003 | Merchant | |
| 6,539,019 B1 * | 3/2003 | Noy et al. | 370/395.53 |
| 6,684,241 B1 * | 1/2004 | Sandick et al. | 709/220 |
| 6,778,525 B1 * | 8/2004 | Baum et al. | 370/351 |
| 2002/0003801 A1 | 1/2002 | Hwa et al. | |
| 2002/0052972 A1 * | 5/2002 | Yim | 709/245 |
| 2003/0189905 A1 * | 10/2003 | Lee | 370/254 |
| 2003/0208577 A1 * | 11/2003 | Grigsby | 709/223 |
| 2004/0042416 A1 * | 3/2004 | Ngo et al. | 370/254 |
| 2005/0044271 A1 * | 2/2005 | Bastide et al. | 709/245 |

\* cited by examiner

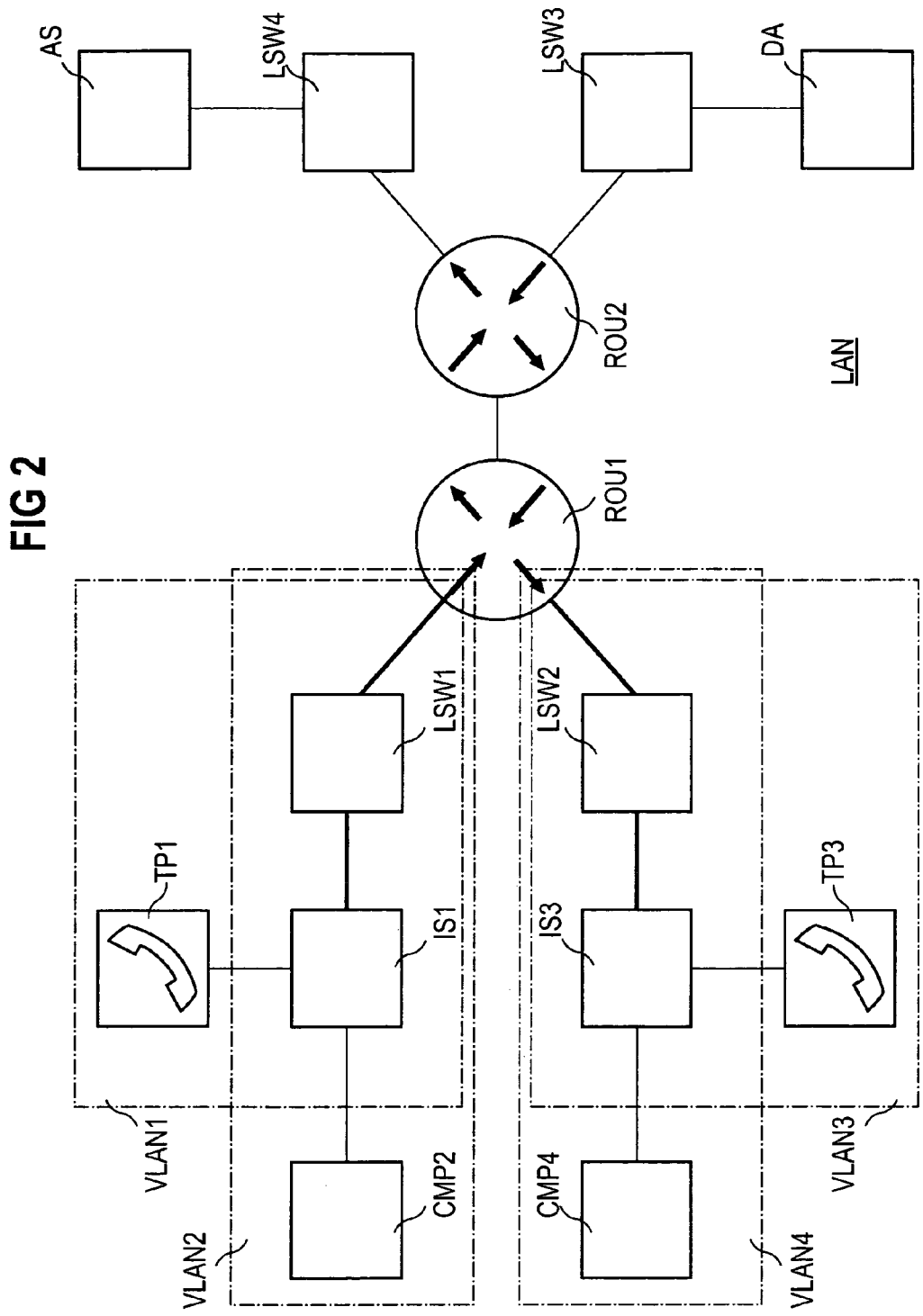

METHOD FOR THE AUTOMATIC CONFIGURATION OF A COMMUNICATIONS DEVICE

CROSS REFERENCE TO RELATED APPLICATIONS

This application is the US National Stage of International Application No. PCT/EP2004/002265, filed Mar. 5, 2004 and claims the benefit thereof. The International Application claims the benefits of German application No. 10319323.5, filed Apr. 29, 2003, both applications are incorporated by reference herein in their entirety.

FIELD OF INVENTION

The invention relates to a method for the automatic configuration of communications devices in logical network areas.

SUMMARY OF THE INVENTION

For logical segmentation of packet-oriented networks—often also referred to by specialists as LANs or Local Area Networks—one form is known in which the network is organized as a so-called virtual LAN.

A virtual LAN or VLAN is formed by a group of network nodes which are grouped into autonomous domains or broadcast domains. Whether or not a network node belongs to a VLAN does not depend on the geographical location of the network node. It is exclusively determined by software configuration and can be changed if a network node is to be assigned to a new workgroup.

If a virtual LAN is to be extended over a number of network node devices, expanding the MAC (Media Access Control) address which identifies the destination and the origin of the data packets exchanged by an identification number of the virtual LAN is advantageous. This identification number is mostly referred to as a VLAN number or VLAN ID or Virtual LAN Identification Number.

With a method referred to as frame tagging a VLAN ID identifying the VLAN is set as a tag (marking) after the type field of the MAC packet. This method is standardized in IEEE 802.1Q and uses a word length of 12 bits for the tag. This theoretically gives values for the VLAN ID of 0 to 4095. In 802.1Q networks tag-free MAC packets can continue to be exchanged for compatibility reasons. These tag-free MAC packets are allocated a VLAN ID with a value of between 1 and 4095. Tag-free MAC packets are assigned to what is known as a native VLAN. Data packets tagged with a VLAN ID of 0 (zero) are also to be assigned to this native VLAN. In this description the terms "tag" and "identification number" cover both the cases of tagging with VLAN ID values between 0 to 4095 as well as the equally-likely possibility that a MAC packet is not tagged.

One embodiment of a virtual LAN is what is known as the port-based VLAN. In this a VLAN is set up to extend within an IP (Internet Protocol) subnetwork or also to cover a number of IP subnetworks and mapped at a number of ports of a network node device. The network node device is usually embodied as a switch, the mapping to ports of this switch also being referred to as switchport mapping.

One application of a virtual LAN is produced by connecting telephony components which use packet-oriented communication to a VoIP (Voice-over-IP) communication network. A communications device—for example a VoIP telephone—with a predetermined VVID (Voice VLAN ID) is usually connected to the switch. The designation Voice VLAN ID already indicates that a VLAN assigned to this VLAN ID is predominantly reserved for connection of telephony components.

Otherwise the connection to a switch is not absolutely vital for a device of a VLAN. Instead of port-based virtual LANs, VLANs without an assigned switch are also conceivable.

A communications device assigned to a VLAN can in its turn contain a switch—e.g. arranged internally. This internal switch is used to connect a computer system to the communications device in order to ensure the exchange of data of both data processing services and also communication services with a shared data link. Such an arrangement is thus often referred to by the phrase "Single Wire to Desk".

While the communications device usually communicates using data packets tagged on the basis of an identification number (VVID)—"Tagged Frames"—the computer system connected to it usually uses "Untagged Frames", i.e. data packets which do not contain an identification number (VVID or VLAN ID).

The description below assumes a usual port configuration of the switch in which only untagged data packets as well as tagged data packets are forwarded with the VVID provided for this port. For putting the communications device into service this device is to be connected to the port of the switch for example. The VVID assigned to the VLAN—for example provided for this port—is to be configured in the communications device since the switch discards any data packet which does not contain the VVID provided for the connected port. Data packets without a tag containing a VVID are reserved for data communication with the processing unit and also pass the switch.

The configuration of the VVID at each of the communications devices in a communication system is a time-consuming exercise when a plurality of communications devices are put into operation for the first time. Furthermore this configuration has to be undertaken again each time that the communications device is moved to another location since each connector socket is generally assigned to another switchport with a different VVID in each case. Manual configuration is a complex process involving extensive outlay in personnel and time. For a more rational commissioning the aim is thus automatic configuration of the VVID of communications devices or of the VLAN ID of packet-oriented communicating terminals in a port-based virtual LAN.

A method for an automated configuration of a VLAN ID in a virtual LAN is already known from US patent application US 2002/0003801 A1. A communication end point connected to a switch sends a confirmation message tagged with a selected VLAN ID to the switch and waits for a response message. If no response message arrives from the switch, the selected VLAN ID is tagged as invalid and the process is repeated with another VLAN ID until a response message arrives from the switch for this type of acknowledgment message. The VLAN ID selected for the acknowledgement message is tagged as valid for this port-based VLAN and the communication end point is reconfigured with this VLAN ID. To select a VLAN ID to be checked by the communication end point information in GVRP messages ("GARP VLAN Registration Protocol" with GARP standing for "Generic Attribute Registration Protocol") is used which is sent at intervals from the switch to all end points connected to it. These GVRP messages contain the VLAN IDs of all communication end points connected to the switch.

The particular disadvantage of this method is that the switch must be embodied in this case with a control logic to handle GVRP messages. A further disadvantage lies in an increased amount of data which needs to be exchanged because of the need to "try out" different VLAN IDs during the configuration phase.

The object of the invention is to provide means for an automated configuration of communications devices in a virtual packet-oriented network which when used will avoid the disadvantages stated above.

The object is achieved by the claims.

In accordance with the invention a configuration message is transmitted by a network element localized outside a subnetwork. The subnetwork is to be understood for example as a domain within a packet-oriented network, for example a Local Area Network, LAN. The network element is present for example as a self-contained server unit, or also in the form of an executable process on a communicating unit at any location. The communications device is assigned to a virtual network. The virtual network in this case extends at least partly within the subnetwork and can also alternatively extend over a number of subnetworks. The configuration message is initially sent to a network node device administering the subnetwork, usually a so-called level-3 switch or router. The network address of the subnetwork is entered in this case as the destination address of this configuration message. This network address is entered for example in a directed broadcast format. The network address of the subnetwork administered by the network node device entered as destination in the configuration message tells the network node device to send this in the form of a broadcast message to the virtual network, in which case on 802.1Q trunks explained in greater detail below for forwarding of the configuration message as a broadcast message to a virtual network by the router or switch the broadcast message is supplemented by the identification number intended for the virtual network, if the VVID does not match a so-called native VLAN of the trunk defined in IEEE 802.1Q. The broadcast message is received and processed by the communications device. In this processing the identification number sent with the message is read out and the communications device configured with this number.

A significant advantage of the method in accordance with the invention can be seen in the fact that no additional tasks or processing steps are required for the existing network node device for application of the method in accordance with the invention. The procedural steps involved in converting the configuration message into a broadcast message as well as the use of an identification number are included in the normal processing steps of this type of network node device, configured as a router for example.

An advantage of the method in accordance with the invention is further to be found in a central point for administration of configuration messages or for transfer of these communication messages. The configuration messages themselves do not have to be generated in the subnetworks or virtual networks here but can be transmitted over the entire packet-oriented network with the involvement of further routers to the network node device and finally to the communications device.

A further advantage of the method in accordance with the invention can be seen in the fact that for an automatic configuration of all communications devices of a VLAN only one individual configuration message is required. This renders traffic which imposes a load on the network as a result of request messages and response messages for each communications device superfluous.

A further advantage of the method in accordance with the invention arises from the initial installation of all communications terminals when a new communications system is set up. The method in accordance with the invention guarantees a configuration of each terminal without any manual intervention being required other than physical installation of the devices.

Advantageous developments of the invention are specified in the dependent claims.

Advantageously addressing is undertaken by the network address in the form of a directed broadcast network address. This measure guarantees economic data management in the assignment of network addresses to associated virtual networks. Since network node devices administering a number of subnetworks, as recipients of a directed broadcast message, tag this message before forwarding it to the designated (directed) virtual network with a reserved identification number in each case—or leave it untagged, if an existing VLAN ID matches the port VLAN ID defined in 802.1Q—and forward it as a broadcast message into this area, the unique addressing of the identification number to be transmitted is guaranteed.

An advantageous embodiment of the invention provides for a level-2 network node device or switch arranged between the network node device and the virtual network. To put it more precisely this switch is also a component of a virtual network defined in this way. An advantage of this switch is that is guarantees a defined transition interface through which the virtual network is collectively linked via a dedicated router uplink to the overall network in conjunction with topological arrangement of the subscriber structures. Advantageously no requirements are to be imposed on a standardized switch for executing the method in accordance with the invention, in particular no specific processing steps on this switch have to be defined.

In a preferred embodiment for a communications terminal as well as for a connected processing unit in an IP subnetwork one VLAN is covered in each case and is mapped onto precisely one port of the switch (port or switchport) in each case. The uplink ports between the switches and to the router interface are defined as what are known as Q trunks so that any data traffic which is not restricted to a subscriber's IP subnetwork must pass the router. A connection between 802.1Q-capable network elements is referred to as a trunk connection, i.e. terminals which understand the VLAN packet format and which can read out the tag of a packet. Such a trunk makes multiplexing of a number of VLANs between a number of VLAN network elements possible.

Advantageously this switch only passes data packets which contain a provided identification number (VLAN ID or VVID) in a marker section "tag" of an 802.1Q header.

In a further advantageous embodiment of the invention the switch features a number of ports, with each port being assigned a virtual network with an identification number or VLAN ID in accordance with so-called switchport mapping.

An exemplary embodiment with further advantages and embodiments of the invention is explained in more detail below on the basis of the drawing.

BRIEF DESCRIPTION OF THE DRAWINGS

FIG. 2: shows a structure diagram for schematic representation of a packet-oriented network.

DETAILED DESCRIPTION OF INVENTION

Figure 1A:
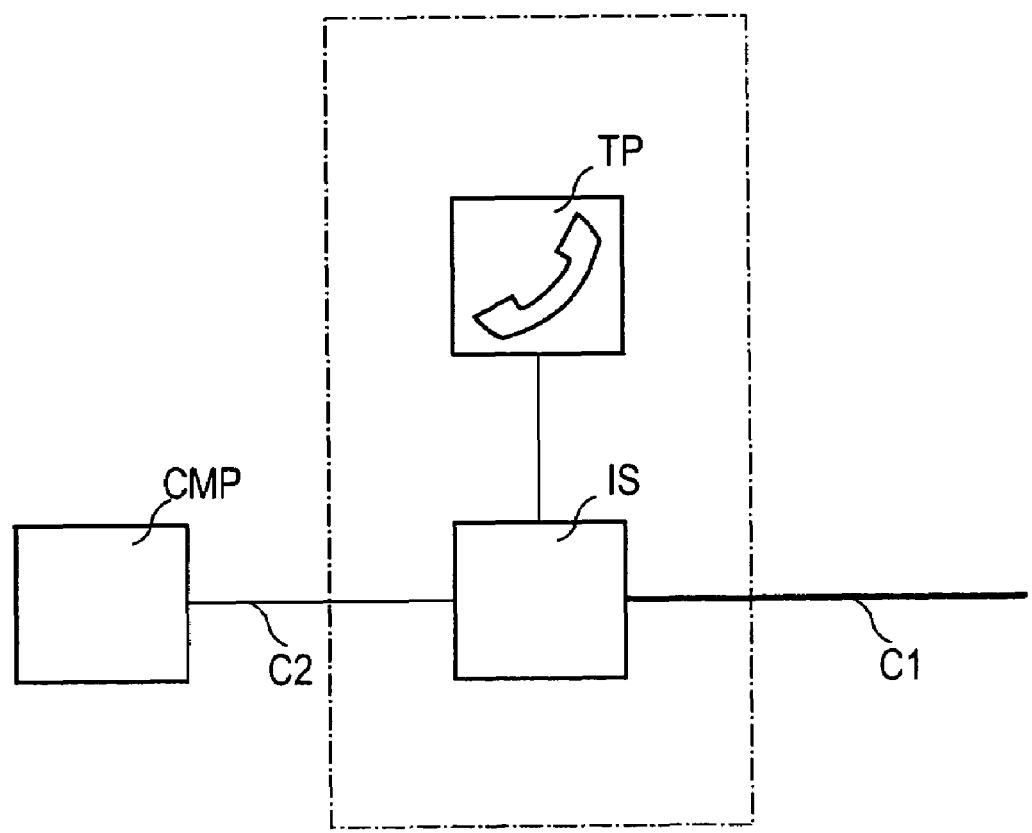
FIG. 1A: shows a structure diagram for schematic representation of an arrangement of a computer system and a communication unit.

FIG. 1A shows a communications device TP, which is embodied for example as a VoIP (Voice over Internet Protocol) telephone TP. An internal switch IS is assigned to the communications device TP or is also—illustrated by a box with a dotted and dashed outline—a part of this communications device TP. A first connection C1 leading towards or away from the internal switch IS is shown in the diagram by a more solid line in order to illustrate that the bidirectional data link of this first connection C1 transports both the data traffic for the communications device TP and also for a computer system CMP. Because of this fact the second connection C1 is often also referred to as a trunk. The communications device TP is connected by a second connection C2—for example via the internal switch IS—to the computer system CMP.

The method in accordance with the invention is explained in greater detail below, with further reference to the functional units of the preceding figures in each case.

Figure 1B:
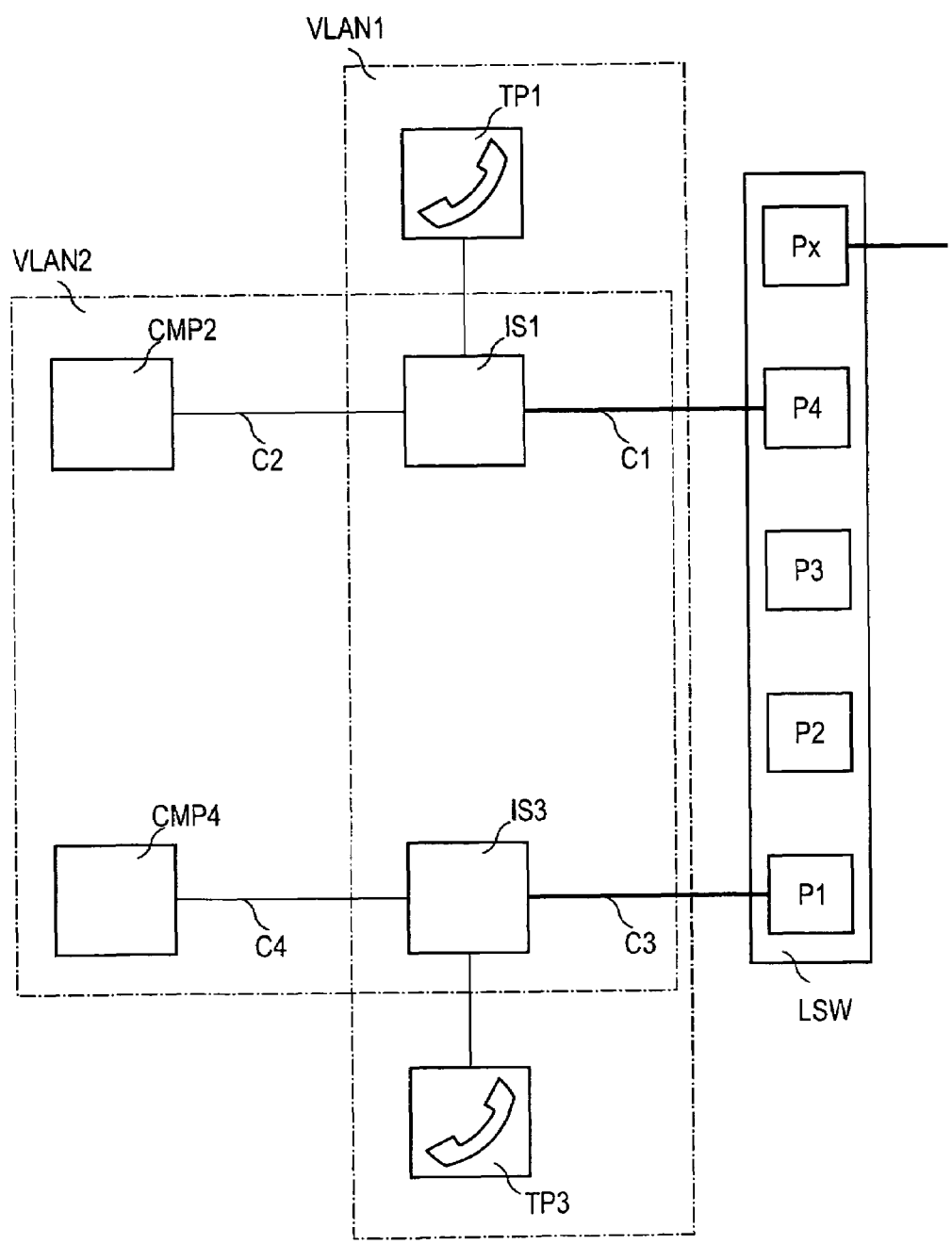
FIG. 1B: shows a structure diagram for schematic representation of a connection of a computer system and a communication unit to a switch.

FIG. 1B shows a first communications device TP1 with an assigned internal switch IS1, which is connected via a connection C2 to a computer system CMP2. The communications device TP1 is connected via its internal switch IS1 to a port P4 of a switch LSW by means of a connection C1.

A further communications device TP3 with an assigned internal switch IS3 is connected via a connection C4 to a further computer system CMP4. The further communications device TP3 is connected via its internal switch IS3 to a further port P1 of the switch LSW.

The switch LSW contains a number of ports, of which a first port P1, a second port P2, a third port P3 and a fourth port P4 are shown in the drawing. A further port Px serves for example to connect the switch to a network node device—not illustrated—for example a further switch or a router. In the further embodiment to describe the figure on the basis of FIG. 1B only a circuit of the first and of the fourth ports P1,P4 is considered. Further ports P2,P3,Px of the switch LSW are optionally connected to further network elements—not shown. A trunk connected to the port Px is merely indicated in the drawing.

A first virtual network VLAN1 comprises the two communication terminals TP1,TP3 and the internal switches IS1,IS3 assigned to them in each case. The second virtual network VLAN2 comprises the two computers CMP2 and CMP4 as well as the internal switches IS1,IS3 assigned to the two communication terminals TP1,TP3 in each case. The two virtual networks VLAN1,VLAN2 further comprise the switch LSW and also other network elements—not shown—which are connected to the port Px for example. For reasons of clarity the fact that the switch LSW as well as further network elements belong to the virtual network VLAN1, VLAN2 is not shown in the drawing in FIG. 1B.

Furthermore it is assumed for reasons of clarity that in the exemplary embodiment the first virtual network VLAN1 with a first subnetwork covers the second virtual network VLAN2 with a second subnetwork. In technical implementations it is possible in some cases to extend the virtual networks VLAN1,VLAN2 over a number of subnetworks.

A subnetwork defines an area within a larger network area. A subnetwork is addressed by an IP (Internet Protocol) address with the aid of a subnet mask. This specifies the bit of an IP address up to which the network component extends, the other bits of the IP address characterize what is known as a host component. The network component designates the network which is to be addressed, the host component addresses the host in this network An IP address is specified for example using a 32-character binary number. To make it easier to understand, this binary number is subdivided into four octets of eight bits each, the period is used as a separator. Each octet can now be converted into a decimal number which can have values of between 0 and 255. A network address is the first address in a network which can also be a subnetwork. The network address does not identify a host in this network but rather the overall network. There cannot be a network element which has this address.

The example discussed below assumes a network address of 10.1.1.0 for the first subnetwork—identical as regards the area that it covers to the first virtual network VLAN1, whereby the host component in the subnetwork for example is restricted to the last octet, an associated subnet mask is consequently to be specified with 255.255.255.0.

The first virtual network VLAN1 is illustrated in greater detail below.

In a configured operating mode a virtual network VLAN1 is defined by the communications devices TP1 and TP3 using what is known as the frame tagging method. To this end the communications device TP1 exchanges data packets in the configured operating mode with the switch LSW, in which a MAC ("Media Access Control") address identifying the destination and the origin is expanded by a 12-bit IEEE 802.1Q standardized tag or marking. This identifier or marking contains in this case the identification number of the VLAN defined by it and, because of the real-time communication character of the communications device TP, is designated as a Voice VLAN ID ("VVID"). In a general designation this VLAN ID is also referred to by the term "identification number". Since in the following exemplary embodiment virtual networks for structuring communication networks are considered, the designation VVID is mostly used.

By contrast with the exchange of tagged data packets by the communications device the computer system CMP2 exchanges non-identified or non-tagged data packets ("Untagged Frames") with switch LSW. These untagged data packets are predominantly reserved for pure, non-realtime-critical data communication.

In a mode in which the communications device TP1 is not yet configured, this device has no knowledge of the VVID to be used in its virtual network VLAN1 for packet-oriented communication. Furthermore it has not yet been assigned any network address or IP (Internet Protocol) address valid in the overall packet-oriented network—not illustrated. Such a mode not only occurs when the communications device TP1 is put into operation for the first time but also after a restart of the communications device system TP1 or after a "replugging" of the communications device TP at one of the other ports P1,P2,P3 of the switch.

Without knowledge of the valid VVID no request message to a computer featuring an IP address—not shown—is possible either, since the switch LSW1 on the one hand discards all data packets with a VVID which is not the same as the one provided for the virtual network VLAN1 and on the other hand untagged data packets without a VVID are generally reserved for pure data communication.

A general description of an IP address assignment based on the DHCP protocol is initially given below without reference to the drawing.

The DHCP (Dynamic Host Configuration Protocol) is a client/server protocol which handles the allocation of IP addresses. DHCP is used for dynamic and automatic terminal configuration, e.g. issuing IP addresses. The corresponding IP addresses are requested by the connected DHCP clients at a DHCP server. The addresses are taken from an address pool which is defined at the DHCP server. For the dynamic assignment a client is temporarily issued with an IP address valid for a specific time. If the IP address is no longer needed by the client, the server has this address available again and can issue it to another client for example.

The DHCP protocol recognizes a number of message types with which the overall exchange of information between client and server is controlled. A request message (DHCP-Discover) of the client is sent by means of a (broadcast) message sent to the entire network to check the network for different DHCP servers. As a response message (DHCP-Offer) the DHCP server sends a broadcast message or a directed message (Unicast), in which a configuration is proposed to the client. If the DHCP client accepts the configuration parameters offered, it uses a broadcast to transmit a request message (DHCP-Request). The server then uses an acknowledgement message (DHCP-Acknowledge) to send the IP address and/or optionally further configuration parameters. If the IP address is no longer needed by the client, the latter sends a release message ("DHCP-Release") to the server. Specific messages must be sent on both the server and the client side as broadcast messages so that all other clients and servers are informed about the configuration and do not unnecessarily reserve addresses and configurations. Since specific network node devices do not generally forward undirected broadcast messages, there also exist "directed" broadcast messages. For the case of a DHCP request message however this non-forwarding does not generally apply.

The DHCP method in the form previously described requires a DHCP server in each virtual network since undirected broadcast messages are not generally transported across VLAN boundaries. The DHCP protocol however provides for an optional forwarding of the broadcast messages by what are known as DHCP relays. Thus each VLAN only needs a DHCP relay which mostly forwards the broadcast message as a directed message to one or more DHCP server. The DHCP relay in this case enters into the message the own address of the port at which the broadcast message was received. The DHCP server now decides on the basis of this address and other considerations which information to return. Often this forwarding function is taken over by routers.

In anticipation of the description of FIG. 2, a router there, ROU1 has implemented two DHCP relay functions: One at a virtual port to a first virtual network VLAN1 there and one at a virtual port to a second virtual network VLAN2 there. For forwarding untagged DHCP messages it enters a valid address for the second virtual network VLAN2 there, whereas before forwarding DHCP messages tagged for the first virtual network VLAN1 it enters its address valid for the first virtual network VLAN1 into a data part of the DHCP message.

Before the communications device TP1 can obtain an IP address a configuration of the VVID is first necessary. This configuration has previously mostly been undertaken by a service engineer who sets the VVID manually on each communications device of a communication system—not shown.

A first strategy for automatic configuration of the communications device TP1 is to store the VVID last used, i.e. the one valid in the virtual network. When the communications device TP1 is restarted, e.g. as a consequence of a power outage, storage of the last VVID produces a successful configuration; The stored VVID is used for a request message of a DHCP server—not shown. The request message is allowed through by the switch LSW and passed on to the DHCP server which reserves a network address or IP address for the communications device TP1 and notifies the latter in a response message to the communications device TP1. With this acknowledgement it is again possible at the communications device TP1 to set the last stored VVID as the currently valid VVID, which concludes the automatic configuration of the VVID.

In the case of replugging the communications device TP1, for example from the original fourth port P4 to the third port P3, there are certain situations in which the automatic configuration described above based on the last stored VVID is not successful. Since at this third port P3 for example there is a virtual network—not shown—which uses a VVID with a different value, all corresponding messages sent by the communications device TP1 with a VVID assigned to the first virtual network VLAN1 are discarded by the switch LSW.

The absence of a response message to a request message—containing an invalid VVID in the new virtual network—to the DHCP server—not shown—means that a last remaining option for automatic configuration by the communications device TP1 is a scan process. With this scan process for example a number of request messages are generated with an incremented VVID in each case, until with a correct VVID the request message passes through the switch LSW and an acknowledgement message is obtained from the DHCP server at the communications device. Dictated by a bit width of 12 for the VLAN-ID field, a total of 4095 further VVIDs are to be scanned in addition to the untagged VLAN and VLAN 0.

The first virtual network VLAN1 can—as already indicated—be occupied by a number of subnetworks in an alternate embodiment via a connected router—not shown. To configure all communications devices in the first virtual network VLAN1 automatically, it is sufficient to send only one configuration message in one of the subnetworks of the first virtual network VLAN1. All communications devices TP1, TP3 are thus configured with the correct VVID, even if they are later assigned IP addresses for different subnetworks by the DHCP server.

FIG. 2 shows a larger overview of the packet-oriented network LAN.

In a similar way to the previous exemplary embodiment a first communications device TP1 is connected via an assigned internal switch IS1 to a first switch LSW1. There is no presentation of individual ports of the first switch LSW1 in FIG. 2. At the first communications device TP1 a computer system CMP 2 is connected via the internal switch IS1. The virtual networks VLAN1,VLAN2 as before have the same extent as the associated subnetworks. Unlike the simplified presentation according to FIG. 1B the virtual networks VLAN1, VLAN2 are shown more correctly as regards their extent over the first switch LSW1 up to the first router ROU1.

In a similar way a further communications device TP3 is connected via an assigned internal switch IS3 to a second switch LSW2. A further computer system CMP4 is connected to the further communications device TP3 via the internal switch IS3. The virtual networks VLAN3,VLAN4 structured in a similar way to the above virtual networks VLAN1, VLAN2 have the same extent as the associated subnetworks in each case.

The first router ROU1 as well as a further router ROU2 is shown in the drawing by a circle containing arrows, with the direction of the arrows merely equating to the function of the routers ROU1,ROU2 and not to a direction indication of the connected network elements. The first router ROU1 is connected to the second router ROU2.

The dotted boxes symbolizing a virtual network VLAN1, VLAN2,VLAN3,VLAN4 in each case extend into the diagram of the first router ROU1, to indicate that a relevant first router ROUL—not shown—defines or administers a relevant subnetwork.

A third and a fourth switch LSW3,LSW4 are connected to the second router ROU2. A Discovery Agent DA is connected to the third switch LSW3, a network address server is connected to the fourth switch LSW4. The network address server AS operates for example in accordance with the DHCP protocol described above.

A router is a coupling element which connects subnetworks on a network or level-3 layer to each other. For the method for automatic configuration of the VVID of a communications device TP1,TP2 to be described below in accordance with the invention a significant requirement is for configuration messages to be able to be sent from a central location outside the virtual packet-oriented network VLAN1, VLAN2, possibly via a number of routers ROU1,ROU2 through to the telecommunications device TP.

These configuration messages are transferred by a Discovery Agent DA, which is for example present in the exemplary embodiment as a self-contained hardware and/or software unit. In technical implementations of this Discovery Agent DA this is executed as an alternative as a process or as software logic on any computer which communicates with the LAN.

The Discovery Agent DA periodically sends configuration messages at prespecifiable time intervals, for example every ten seconds. To enable this to be done, a database of the Discovery Agent DA contains data records as to the subnetworks in which communications devices are present to which the configuration messages are to be sent.

These configuration messages are sent as directed broadcast messages in the relevant subnetworks and optionally include a data part containing information that the recipient of this message is located in a VoIP subnetwork and what the VLAN ID of this subnetwork is. Otherwise no particular requirements are imposed on the further structure of these messages, in practice they can be simple messages referred to as "Hello" messages.

Via the second router ROU2 as well as via further possible intermediate routers—not shown—these messages finally reach the first router ROU1 which has configured the subnetworks at its virtual VLAN ports—not shown—to the first or second switch LSW1,LSW2.

At the first router ROU1 administering the subnetworks the directed broadcast character of the configuration message is converted into a direct broadcast valid for the subnetworks. A directed broadcast into the first subnetwork with the destination address 10.1.1.255—in the exemplary embodiment coinciding with the first virtual network VLAN1—is for example converted into a destination address with the value 255.255.255.255 and transferred to the port of the first router ROU1 in direction of the first switch LSW1. At the same time the identification number of the virtual network VLAN1 is used as the 802.1Q tag in a header of the broadcast message for the first subnetwork thus converted from the configuration message, if the first virtual network VLAN1 is not the native VLAN of the outgoing port.

From the tag entry of this configuration message the first communications device TP1 can read out the VVID corresponding to the virtual packet-oriented network VLAN1. Optionally this VVID is also additionally contained in a data part of the configuration message originally sent by the Discovery Agent, since this is often easier to read out there.

The conversion of the configuration message with a valid VVID by the first router ROU1 ensures that exclusively configuration messages with the VVID valid for the relevant virtual network VLAN1,VLAN2 are transferred by the relevant switch LSW1,LSW2 to the relevant communications device TP1,TP2. Over and above this the first router ROU1 does not have to be specifically embodied, since this conversion is a normal operation for routers.

The Discovery Agent DA for example contains a table for transferring configuration messages in which information addressing the relevant subnetwork of a relevant virtual network VLAN1,VLAN2 is stored. This addressing information is available for example in the form of the network address and network mask of the relevant subnetwork. As an alternative to storage of a network address and network mask, a directed broadcast address is stored in the table of the Discovery Agent DA. Additional storage of the VVID valid in the relevant virtual network VLAN1,VLAN2 can make sense but is not necessary for a successful configuration, since—as already mentioned—the VVID is assigned in the form of the identification number by the first Router ROU1.

The invention claimed is:

1. A method for the automatic configuration of a communications device with a reserved identification number, wherein
    at least one network node device is provided for administering a subnetwork of a network, wherein
    at least one virtual network comprising at least one subnetwork is provided, wherein the communications device is assigned to the virtual network, wherein data packets exchanged within the virtual network are tagged with a VLAN identification number, the method comprising:
    determining subnetwork addressing information by a network element arranged in the network,
    transmitting a configuration message with the subnetwork addressing information from the network element to the network node device,
    forwarding the configuration message from the network node device to the virtual network, wherein the configuration message is forwarded as a broadcast message tagged with the VLAN identification number,
    receiving the broadcast message by the communications device, and
    configuring the communications device on the basis of the VLAN identification number;
    wherein on failure of the network element of the communications device a message is sent with a tag number to a second network element, and wherein
    in the case of no response message being received by the second network element, the send process is repeated by the communications device with a changed tag number, and, wherein
    in the case in which a response message is received by the second network element, the tag number is used as the identification number.

2. The method in accordance with claim 1, wherein the network node device is embodied as a router.

3. The method in accordance with claim 2, wherein the information addressing the subnetwork is a directed broadcast address.

4. The method in accordance with claim 2, wherein the information addressing the subnetwork is a network address and/or a network mask.

5. The method in accordance with claim 1, wherein the information addressing the subnetwork is a directed broadcast address.

6. The method in accordance with claim 1, wherein the information addressing the subnetwork is a network address and/or a network mask.

7. The method in accordance with claim 1, wherein the identification number is entered in a protocol header of the broadcast message in accordance with the IEEE 802.1Q Standard.

8. The method in accordance with claim 1, wherein the identification number is entered into a data part of the configuration message created by the network element.

9. The method in accordance with claim 1, wherein the configuration message is sent at intervals.

10. The method in accordance with claim 1, wherein the identification number is used in the communications device for configuring a VLAN ID characterizing the virtual network.

* * * * *